United States Patent [19]
Shibata

[11] 3,758,836
[45] Sept. 11, 1973

[54] ELECTRIC CONTROL SYSTEM FOR ALTERNATING CURRENT CIRCUIT

[76] Inventor: Fukuo Shibata, No. 3-8, 2-chome, Taidera, Akashi city, Hyogo-prefecture, Japan

[22] Filed: Feb. 3, 1972

[21] Appl. No.: 223,069

[52] U.S. Cl................ 318/197, 318/227, 318/235, 322/16
[51] Int. Cl. .......................................... H02p 1/28
[58] Field of Search................... 318/139, 195, 197, 318/227, 237; 322/14, 16

[56] References Cited
UNITED STATES PATENTS

| | | | |
|---|---|---|---|
| 3,315,148 | 4/1967 | Grillo | 322/16 X |
| 3,662,247 | 5/1972 | Schieman | 318/227 X |
| 3,441,822 | 4/1969 | Shibata | 318/197 |
| 3,375,433 | 3/1968 | Haggerty et al. | 318/237 X |
| 3,617,838 | 11/1971 | Brandt | 318/227 X |

*Primary Examiner*—Gerald Goldberg

[57] ABSTRACT

When an alternating current motor is supplied with electric current from an electric power source through an inverter or frequency converter which is composed of controlled rectifiers and whose output terminals of a synchronous generator driven by a rotary machine, the inverter or frequency converter can be A.C. line commutated or separately excited type and simple; and if an electric power is delivered between the said electric power source and the said set of synchronous generator driven by rotary machine not through the said controlled rectifiers, the efficiency of the whole system can be high.

10 Claims, 9 Drawing Figures

ELECTRIC CONTROL SYSTEM FOR ALTERNATING CURRENT CIRCUIT

BACKGROUND OF THE INVENTION

FIELD OF THE INVENTION

This invention is used in fields of electric control system for alternating current circuit which includes an alternating current motor having a stator and a rotor.

DESCRIPTION OF THE PRIOR ART

One of the most important method of speed control of alternating current motor is that by frequency control of alternating current electric power supplied to input terminals of the motor.

In some prior method of speed control of an alternating current motor, an A.C. generator driven by a D.C. motor is used for controlling the frequency of alternating current motor. In such a case, there are various problems concerning with commutators of the D.C. motor, as the capacity of the D.C. motor becomes large when the alternating current motor rating is large. For instance, such an electric control system becomes not only low efficiency system but also considerably expensive system.

In some prior method of speed control of an alternating current motor, a self commutated inverter is used for controlling the frequency of alternating current motor. In such a case, the inverter using semiconductor controlled rectifiers becomes very much complicated, unreliable in operation and expensive as there are various difficult problems in connection with commutations. In such a prior method of speed control for an alternating current motor by a self commutated inverter, the reliability of operation is not so high, as the system is subject to failing of commutation. In order to improve the reliability of operation of such prior motor control system of a self commutated inverter, the system must be very complicated and very expensive.

SUMMARY OF THE INVENTION

It is the primary object of the invention to provide an electric control system for alternating current circuit in which an alternating current motor can be controlled over a wide speed range without sacrificing efficiency of operation or economy of apparatus of this system.

Another object of this invention is to provide an electric control system for alternating current circuit in which an alternating current motor can be controlled with reliability and simplicity.

A further object of this invention is to make it possible to reduce considerably a space of installation of an electric control system for alternating current circuit including an alternating current motor.

Other objects of the invention will in part be obvious and in part appear hereinafter.

Accordingly, this invention is disclosed in the embodiments thereof shown in the accompanying drawings and comprises the features of construction, combination of elements and arrangement of parts which will be indicated in the appended claims.

BRIEF DESCRIPTION OF THE DRAWING

Referring to the drawing.

DESCRIPTION OF THE PREFERRED EMBODIMENTS

Figure 1:
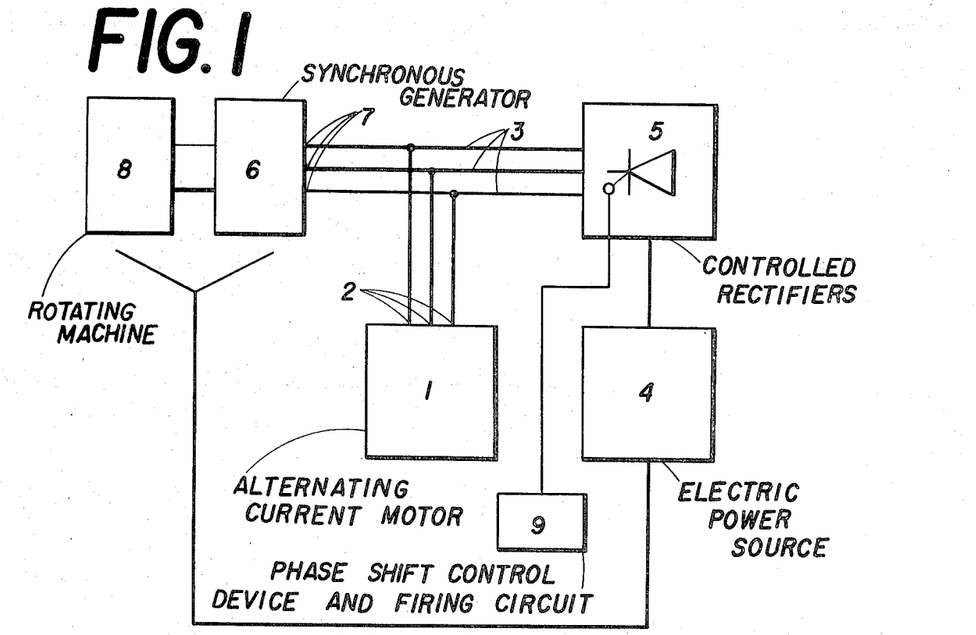
FIG. 1 shows diagramatically a system of this invention.

As shown in FIG. 1, an electric control system for alternating current circuit of this invention has a combination of: an alternating current motor 1 which has a stator winding, a rotor and input terminals 2; an alternating current connection 3 which is arranged to be able to supply the above alternating current motor 1 with electric power; an electric power source 4 which is arranged to be able to supply the above alternating current motor 1 with electric power through the above alternating current connection 3; controlled rectifiers 5 respectively having each gate or control electrode and respectively having main conductive part which means inner circuit connected from anode to cathode and which is connected electrically between the above electric power source 4 and the above alternating current motor 1; a synchronous generator 6 having output terminals 7 which are connected electrically with the input terminals 2 of the above alternating current motor 1 further which are connected electrically with the said main conductive parts of the above controlled rectifiers 5; a rotating machine which is arranged to be able to drive the above synchronous generator 6; a phase shift control device and a firing circuit 9 for the said controlled rectifiers which are electrically connected with the said each gate or control electrode of the controlled rectifiers 5; wherein the said electric power source 4 is electrically connected with the combination set of synchronous generator 6 with the said rotating machine 8 through other circuit than that including the main conductive parts of the controlled rectifiers 5 so that an electric power can be delivered between the said electric power source 4 and the combination set of synchronous generator 6 with the said rotating machine 8 without passing through the said main conductive parts of the said controlled rectifiers 5.

As can be understood from the above explanation, the special features of composition of this invention are as follows: (1) The controlled rectifiers 5 are connected electrically with an electric power source 4 so that the alternating current motor 1 can be supplied with watt component of electric current from the electric power source 4 through the controlled rectifiers 5; and terminals 7 of the synchronous generator 6 are connected electrically with terminals of main conductive parts of the controlled rectifiers so that the controlled rectifiers 5 can be supplied with exciting current or wattless current from the synchronous generator 6. (2) The electric power source 4 is electrically connected with the combination set of synchronous generator 6 with the rotating machine 8 not only through the main conductive parts of the controlled rectifiers 5 but also through other circuit than that including the main conductive parts of the controlled rectifiers 5.

Figure 2:
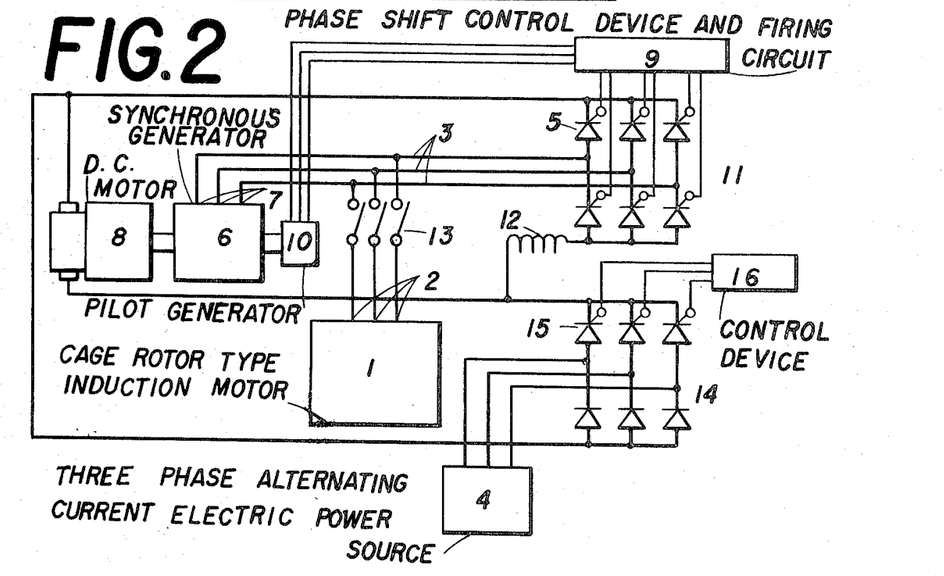
FIG. 2, FIG. 3, FIG. 4, FIG. 5, FIG. 6, FIG. 7, FIG. 8 and FIG. 9 illustrate diagramatically embodiments of this invention.

In FIG. 2, a three phase cage rotor type induction motor 1 is shown as an example of the alternating current motor. A three phase synchronous motor can be used also as an example of the alternating current motor 1. A direct current motor 8 is shown as an example of the rotating machine. In FIG. 2, three phase alternating current electric power source 4 can supply D.C. motor 8 with electric power through a converter 14 composed of controlled rectifiers 15 and control circuit 16 for the control electrode of the controlled rectifiers 15. Thus an electric power is delivered between the electric power source 4 and the set of the synchronous generator driven with the D.C. motor 8 (the said rotating machine) without passing through the main conductive parts, which are inner circuits connected from anodes to cathodes, of the controlled rectifiers 5. The cage rotor type induction motor 1 can be supplied with power component of electric power from the electric power source 4 through the said converter 14, a reactor 12, an inverter 11 composed of controlled rectifiers 5 and a switching device 13; and can be supplied with powerless component of electric power from the synchronous generator 6. In this case, a pilot generator 10 whose construction is similar to that of the synchronous generator 6 and which is driven by the D.C. motor 8 can supply the phase shift control device and firing circuit 9 with control signal for the control electrode of the controlled rectifiers 5. As the synchronous generator 6 supplies only powerless component of electric power of the alternating current connection 3, the synchronous generator 6 can perform its duty when the D.C. motor 8 can drive the motor generator set 8–6 in its no load condition. Therefore the capacity of the D.C. motor 8 can be very small, as the inverter 11 is A.C. line commutated or separately excited type in this condition, the auxiliary circuit of the inverter 11 can be very simple. Thus the control system of the alternating current motor of this invention becomes considerably simple and economical. The cage rotor type induction motor 1 can be controlled, when the control circuit 16 of the converter 14 is controlled. When the control circuit 16 of the converter 14 is controlled, the voltage supplied to the input terminals of the D.C. motor 8 varies, and the speed of the synchronous generator 6 varies. If the voltage at the output terminals of the converter 14 is controlled, not only the speed of the D.C. motor and the speed and voltage of the synchronous generator but also the input terminal voltage of the inverter 11 is controlled. Therefore, even if it is necessary to control the output terminals of the voltage of the converter 14 over wide range, wide range control of the phase shift control device of the inverter 11 is not necessary. The phase shift control device and firing circuit 9 of the control circuit 16 of the converter 14 are those used ordinarily and old in the art. These units are shown, for instance, as 'phase shifter (20) and control transformer (22)' in the U.S. Pat. No. 2,201,006 and 'phase shifter (28) and excitation circuit (22)' in the U.S. Pat. No. 2,288,338.

Figure 3:
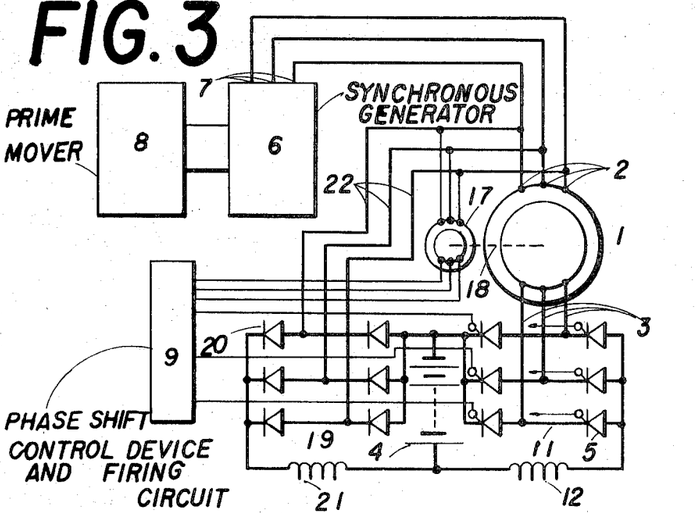

In FIG. 3, a wound rotor type induction motor 1 is shown as an example of the alternating current motor; a prime mover such as a diesel, a gasoline engine, a steam engine, a rotary engine etc. is used as an example of the rotary machine 8; and an electric battery group 4 is shown as an example of the electric power source. In this case, the electric battery group 4 can be supplied with electric power from the synchronous generator 6 through an electric connection 22, a converter 19 composed of rectifiers 20 and a reactor 21. Thus, it can be said also in this case that an electric power can be delivered between the electric power source 4 and the combination set of synchronous generator 6 with the rotating machine 8 without passing through the main conductive parts, which are inner circuits conducted from anodes to cathodes, of the controlled rectifiers 5. The wound rotor type induction motor 1 is supplied with watt component of electric power from the electric battery group 4 through a reactor 12, an inverter 11 composed of controlled rectifiers 5 and the alternating current connection 3; and is supplied with wattless component of electric power from the synchronous generator through the input terminals 2 of the motor 1. The wound rotor type induction motor 1 rotates in a condition of slip $s>1$. That is: the rotor of the induction motor 1 rotates in the direction opposite to that of the rotating field made by the exciting current flowing into the input terminals 2. A wound rotor type detecting device 17 driven by the motor 1 through the shaft 18 is connected electrically through the phase shift control device and firing circuit 9 and the input terminals of the wound rotor type induction motor 1. Thus the control signal can be supplied to the control electrode of the controlled rectifiers 5 of the inverter 11 simultaneously with the electric voltage supplied to the A.C. circuit of the controlled rectifiers 5. The system shown in FIG. 3 can be used as a hybrid drive system in a vehicle or an automobile. The wound rotor type induction motor 1 can be supplied with electric power from the electric battery group 4 connected electrically in parallel with the synchronous generator 6.

When voltage vs. load current characteristics droop, the greater part of the starting or accelerating current of the induction motor 1 can be supplied from the electric battery group 4; the greater part of the current of the induction motor 1 can be supplied from the synchronous generator 6 in a constant load condition of the motor 1; and the electric battery group 4 can be supplied with electric power from the synchronous generator in a light load or no load condition of the motor 1.

Figure 4:
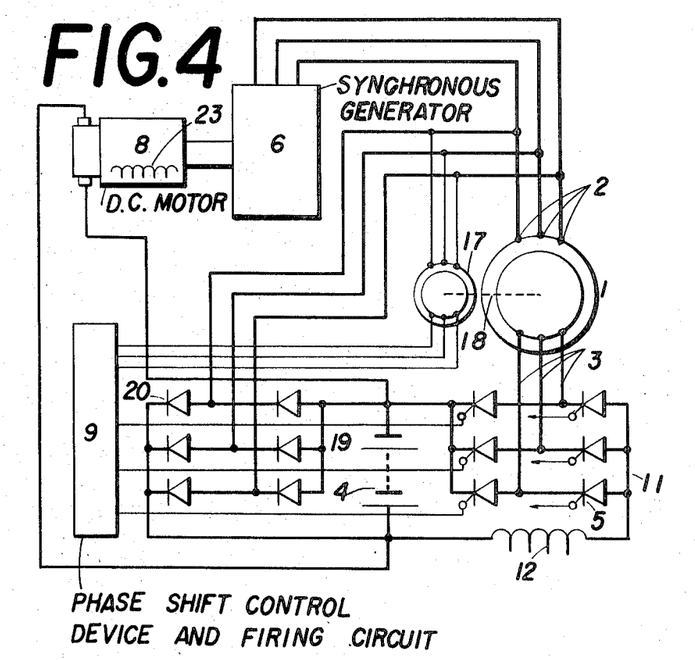

A different point between FIG. 4 and FIG. 3 is that a direct current motor 8 having a field winding 23 is used as an example of the rotary machine in FIG. 4, instead of a prime mover in FIG. 3.

The direct current motor 8 is driven by the electric energy fed from the electric battery group 4. Thus, it can be said also in FIG. 4 that electric power can be delivered between the electric power source 4 and the combination set of synchronous generator 6 with the rotating machine 8 without passing through the main conductive parts, which are inner circuits conducted from anodes to cathodes, of the controlled rectifiers 5.

Figure 5:
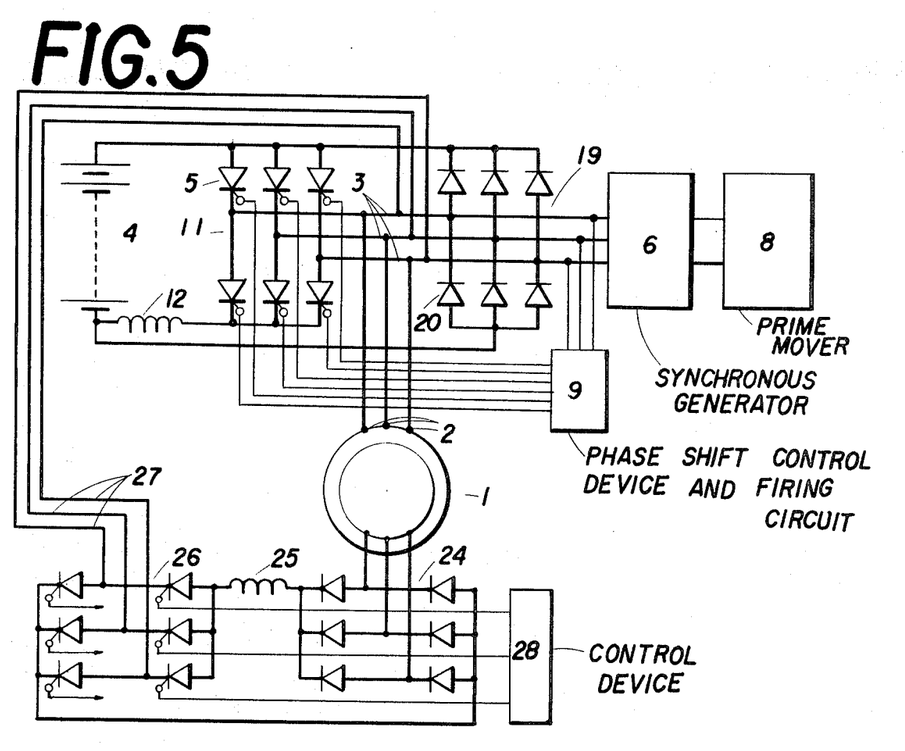

In FIG. 5, a wound rotor type induction motor 1 is used as an example of the alternating current motor. This wound rotor type induction motor 1 can be controlled by a method of Scherbius System. The primary input terminals of the wound rotor type induction motor 1 is supplied with electric power from the electric battery group 4 which is connected electrically in parallel with the synchronous generator 6 driven by the prime mover 8. The arrangement of FIG. 5 can also be applied to a driving system of a vehicle or an automobile. The electric battery group 4 can be connected electrically in parallel with the synchronous generator 6 through an inverter 11 composed of rectifiers 5. As the input terminals 2 of the wound rotor type induction motor 1 are connected with the output terminals of the synchronous generator 6 and with the output terminals of the inverter 11, the wound rotor type induction motor 1 can be supplied with electric power from the electric battery group 4 and the synchronous generator 6. As the electric battery group 4 is also connected electrically with the output terminals of the synchronous generator 6 through a converter 19 composed of rectifiers 20, the electric battery group 4 can be supplied with electric power from the synchronous generator 6. Thus, it can be said also in FIG. 5 that electric power can be delivered between the electric power source 4 and the combination set of synchronous generator 6 with the rotating machine 8 without passing through the main conductive parts, which are inner circuits conducted from anodes to cathodes, of the controlled rectifiers 5.

The secondary winding of the wound rotor type induction motor 1 is connected electrically with the alternating current connection 3 through a converter 24 composed of rectifiers, a reactor 25, an inverter 26 composed of controlled rectifiers and their control device 28 further an electric connection 27. If the secondary winding is short-circuited and the governor of the prime mover 8 is controlled, the engine brake can be operated when the system of FIG. 5 is used in a vehicle.

Figure 6:
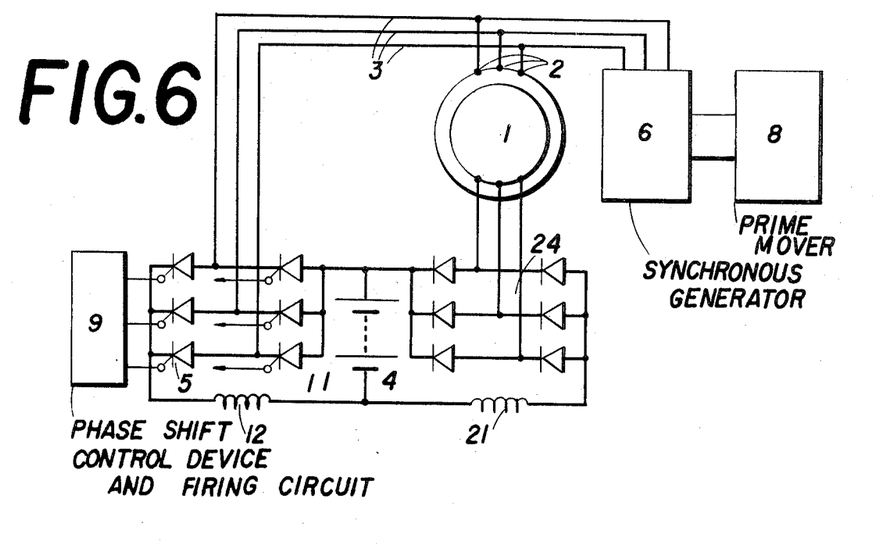

In FIG. 6, a wound rotor type induction motor 1 can be supplied with electric power from the alternating current connection 3 which is connected electrically with the synchronous generator 6 driven by the prime mover 8 and is connected electrically with the electric battery group 4 through the inverter 11. The wound rotor type induction motor 1 can be controlled by controlling the field current of the synchronous generator 6. The system shown in FIG. 6 can be used as a hybrid system of a vehicle or an automobile. It can be said also in FIG. 6 that electric power can be delivered between the electric power source 4 and the combination set of synchronous generator 6 with the rotating machine 8 without passing through the main conductive parts, which are inner circuits conducted from anodes to cathodes, of the controlled rectifiers 5, as electric energy is delivered from the synchronous generator 6 to the electric battery group 4 through the induction motor 1 and the converter 24.

Figure 7:
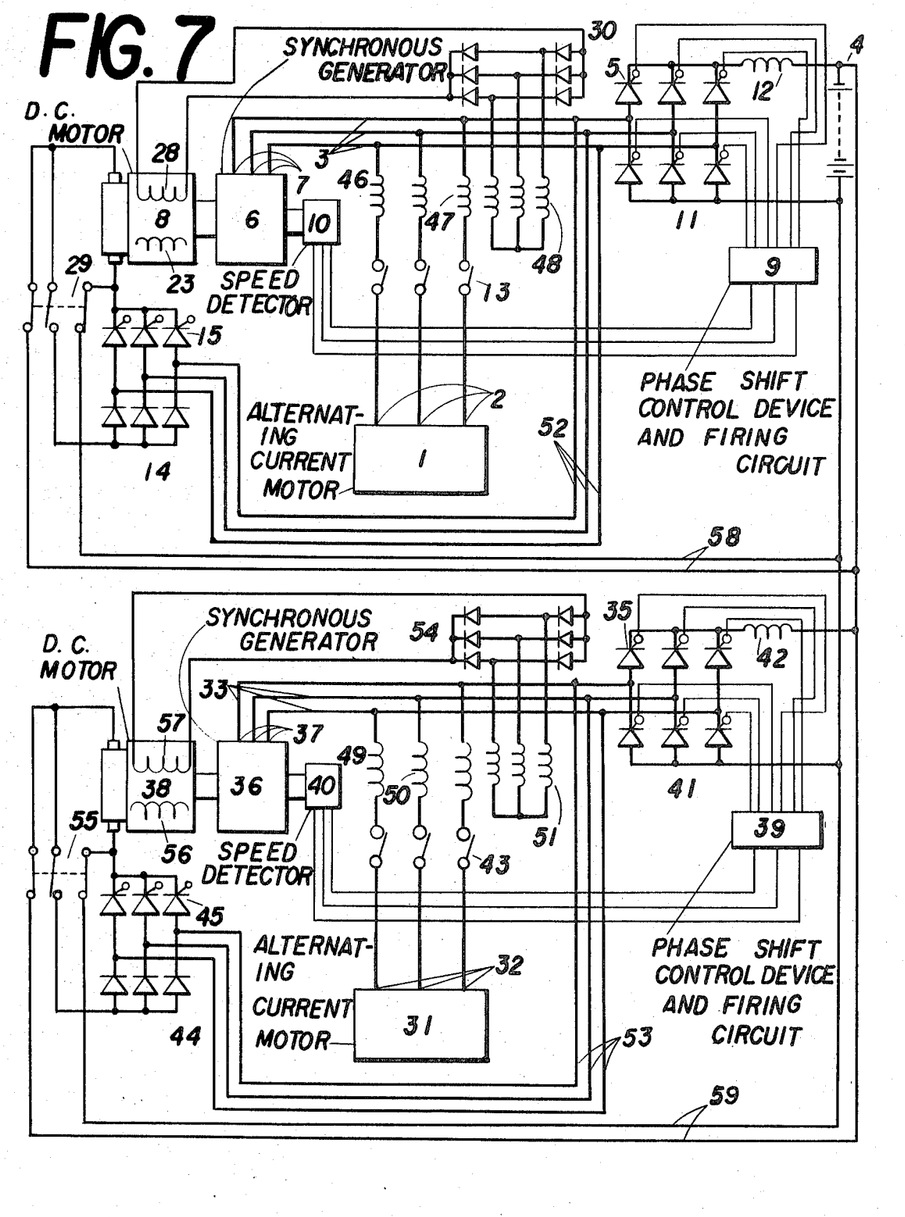

FIG. 7 shows an example of an electric circuit in which two electric motors 1 and 31 can be supplied with electric power from an electric battery group 4. This electric circuit can be used in a vehicle in which each motor 1 and 31 drives each wheel respectively. The direct current motor 8 having field voltage winding 23 and current winding 28 can be supplied with electric power from the electric battery group 4 through an electric connection 58 in the starting condition of the direct current motor 8, and from the alternating current connection 3 through an electric connection 52 in the running condition of the direct current motor 8 by operation of a turn over switch 29. Thus, it can be said also in FIG. 7 that electric power can be delivered between the electric power source 4 and the combination set of synchronous generator 6 with the rotating machine 8 without passing through the main conductive parts, which are inner circuits conducted from anodes to cathodes, of the controlled rectifiers 5, as electric energy is delivered from the electric battery group 4 to the direct current motor 8.

When the load current of the alternating current motor 1 increases, the current in the field current winding 28 supplied from a converter 30 and the current transformer 46 having a primary winding 47 and a secondary winding 48 increases, the speed of the synchronous generator 6 drops, and therefore the speed of the motor 1 drops. Thus, the system can be used in a wheel of a vehicle, without using a differential gear, as the motors 1 and 31 can be controlled respectively according to the wheel condition of the vehicle. The phase shift control device and firing circuit 39 is the same as that 9 which is used ordinarily and old in the art as explained before.

Figures 8, 9:
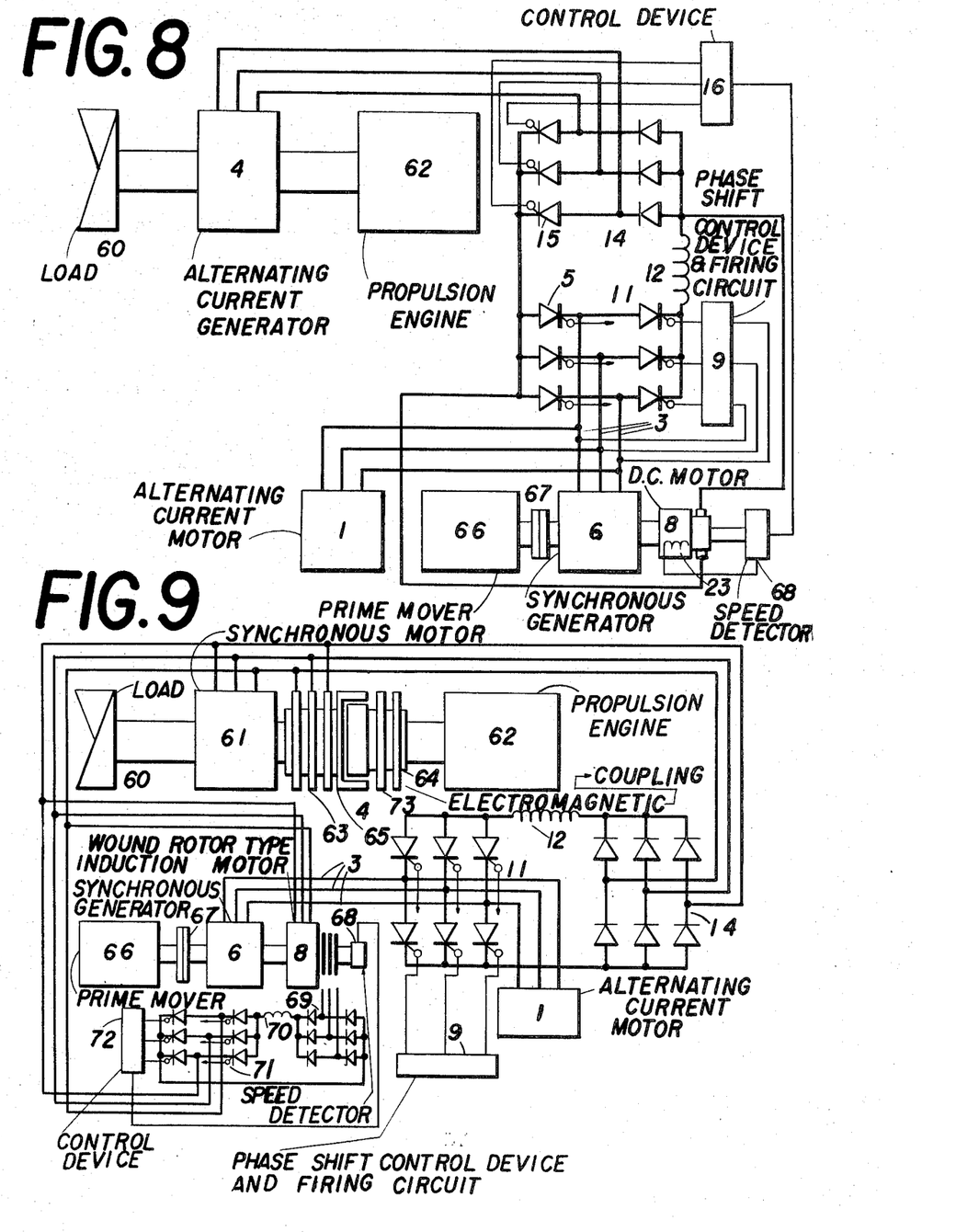

In FIG. 8, a ship generating set is shown. A propulsion engine 62 such as a diesel or turbine drives not only a load 60 such as a propeller, but also a generator 4 as the electric power source. An alternating current motor 1 is supplied with watt component of electric power from the generator 4 through a converter 14 composed of rectifiers 15 and their control service 16, a reactor 12 and an inverter 11 composed of controlled rectifiers 5 and their phase shift control device and firing circuit 9, and is supplied with wattless component of electric power from the synchronous generator 6 driven by a direct current motor 8. The direct current motor 8 can be controlled by controlling the current of the field winding 23. As a speed detector including control device 68 detects the speed of the synchronous generator 6, the speed of the direct current motor 8 can be controlled in a constant speed by controlling the current of the field winding 23 or controlling the control device 16 of the rectifiers 15. Therefore, even if the speed of the propulsion engine 62 is controlled to change within a range, the speed of the synchronous generator 6 can be controlled in a constant speed. So, the speed of the alternating current motor 1 can be controlled in a constant speed.

A clutch 67 is installed in order to remove the synchronous generator 6 from the driving shaft of a prime mover 66 such as a diesel. When the propulsion engine 62 supply the motor 1 with electric power, it is not necessary to drive the prime mover 66, and the clutch 67 removes the synchronous generator 6 from the driving shaft of the prime mover 66. However, when the propulsion engine 62 stops, it is necessary to drive the synchronous generator 6 by the prime mover 66 through the clutch 67. It can be said also in FIG. 8 that electric power can be delivered between the electric power source 4 and the combination set of synchronous generator 6 with the rotating machine 8 without passing through the main conductive parts, which are inner circuits conducted from anodes to cathodes, of the controlled rectifiers 5, as electric energy is delivered from the alternating current generator 4 to the direct current motor 8 through the converter 14.

FIG. 9 shows also another ship generating set. In this case, an electromagnetic coupling 4 coupled mechanically with a synchronous motor 61 is used as the electric power source. This mechanical combination of the electromagnetic coupling 4 with the synchronous motor 61 operates as an electromagnetic gear. There is a speed difference between the primary rotor 64 and the secondary rotor 65. Therefore, if a field winding of the primary rotor 64 is supplied with a direct current from an electric source through slip rings 73, three phase voltage is inducted in an armature winding of the electromagnetic coupling.

The electric power produced in the electromagnetic coupling 4 can be supplied to the alternating current motor 1 through the slip rings 63 of the electromagnetic coupling 4, the converter 14, the inverter 11 and the reactor 12 for the part of the watt component, and through the sliprings 63 of the electromagnetic couplings and the synchronous generator 6 driven by the wound rotor type induction motor 8 for the part of the wattless component. In this case, the wound rotor type induction motor 8 can be controlled by a method of Scherbius system. That is: the secondary winding of the wound rotor type induction motor 8 is connected electrically with the sliprings 63 of the electromagnetic coupling 4 through a converter 69, a reactor 70 and an inverter 71 with its control device 72. The control device 72 operates in order to control the current of control electrodes for controlled rectifiers in the inverter 71 by receiving a signal from the speed detector 68.

Thus the speed of the synchronous generator 3 and the alternating current motor 1 can be controlled in a constant speed, even if the speed of the propulsion engine 62 is controlled to change within a range.

It can be said also in FIG. 9 that electric power source 4 and the combination set of synchronous generator 6 with the rotating machine 8 without passing through the main conductive parts, which are inner circuits conducted from anodes to cathodes, of the controlled rectifiers 5, as electric energy is delivered from the electromagnetic coupling 4 operating as an electric power source to the wound rotor type induction motor 8.

As can be understood from the explanation described hitherto, the special features of effects by operation of this invention are, in general, as follows: (A) The alternating current motor 1 can be supplied with electric power from the electric power source 4 through the controlled rectifiers 5. The controlled rectifiers 5 can be supplied with the exciting current from the synchronous generator 6. If the electric power source 4 is a D.C. source, the controlled rectifiers 5 operates as elements of separately excited or A.C. commutated inverter. It is not necessary to provide a complicated self commutating device in the controlled rectifiers 5, as the commutation power can be supplied to the controlled rectifiers 5 from the synchronous generator 6. (B) The controlled rectifiers 5 can be commutated surely, by receiving the commutating power from the synchronous generator 6. In other words, the electric power of A.C. frequency can be supplied from the electric power source 4 to the alternating current motor 1 through the controlled rectifiers 5, and the A.C. frequency can be controlled surely by the output frequency of the synchronous generator 6. The A.C. frequency of the output power of the controlled rectifiers 5 is same as that of the synchronous generator 6. So long as the frequency of the output power of the synchronous generator 6 is established, the commutation of the controlled rectifiers 5 can be surely done. Thus, the reliability of operation of the inverter composed of the controlled rectifiers 5 is very high, compared with the case of self-commutated inverter. (C) The capacity of the ratating machine 8 driving the synchronous generator 6 can be small, as the synchronous generator 6 operates to supply the controlled rectifiers 5 and the alternating current motor 1 only with wattless current. (D) The efficiency of the system of this invention is comparatively high, as the capacity of the rotating machine 8 is small, and the mechanical loss of the generator set composed of the synchronous generator 6 and the rotating machine 8 is comparatively small.

What I claim is:

1. Electric control system for alternating current circuit which has a combination of:

an alternating current motor which has a stator winding, a rotor and input terminals;
an alternating current connection which is arranged to be able to supply the said alternating current motor with electric power;
an electric power source which is arranged to be able to supply the said alternating current motor with electric power through the said alternating current connection; controlled rectifiers respectively having each gate or control electrode and respectively having main conductive part which means an inner circuit connected from anode to cathode and which is connected electrically between the said electric power source and the said alternating current motor; a synchronous generator having output terminals which are connected electrically with the input terminals of the said alternating current motor further which are connected electrically with the said main conductive parts of the controlled rectifiers;
a rotating machine which is arranged to be able to drive the said synchronous generator;
a phase shift control device and a firing circuit for the said controlled rectifiers which are electrically connected with the said each gate or control electrode of the controlled rectifiers; wherein the said electric power source is electrically connected with the combination set of synchronous generator with the said rotating machine through other circuit than that including the main conductive parts of the controlled rectifiers so that an electric power can be delivered between the said electric power source and the combination set of synchronous generator with the said rotating machine without passing through the said main conductive parts of the said controlled rectifiers.

2. Electric control system for alternating current circuit which comprises in combination as set forth in claim 1, in which the rotating machine is a prime mover.

3. Electric control system for alternating current circuit which comprises in combination as set forth in claim 1, in which the electric power source is an electric battery group.

4. Electric control system for alternating current circuit which comprises in combination as set forth in claim 1, in which the rotating machine is an electric motor supplied with electric power from the electric power source.

5. Electric control system for alternating current circuit which comprises in combination as set forth in claim 1, in which the controlled rectifiers are used as elements of an inverter.

6. Electric control system for alternating current circuit which comprises in combination as set forth in claim 1, in which the electric power source is an alternating current power source, and the rotating machine is composed of a direct current motor arranged to be supplied with electric power from the said electric power source through s converter composed of controlled rectifiers, and further in which the controlled rectifiers described in claim 1 are used as elements of an inverter having input terminals connected electrically with output terminals of the said converter.

7. Electric control system for alternating current circuit which comprises in combination as set forth in claim 1, in which the alternating current motor is a wound rotor type induction motor having the input terminals connected with the electric power source through the controlled rectifiers.

8. Electric control system for alternating current circuit which comprises in combination as set forth in claim 1, in which the electric power source is an electric battery group whose terminals are connected electrically, through a converter composed of rectifiers, with the synchronous generator driven by a prime mover, in a vehicle.

9. Electric control system for alternating current circuit which comprises in combination as set forth in claim 1, in which the rotating machine is an electric motor whose input terminals are arranged to be able to be supplied with electric current from the alternating current connection.

10. Electric control system for alternating current circuit which comprises in combination as set forth in claim 1, in which the electric power source is a generator driven by a prime mover for a ship propulsion.

* * * * *